(12) United States Patent
Smith

(10) Patent No.: US 9,411,059 B2
(45) Date of Patent: Aug. 9, 2016

(54) SOLID STATE SEISMIC TRIGGER SWITCH

(76) Inventor: Bret William Smith, Brooklyn Park, MN (US)

(*) Notice: Subject to any disclaimer, the term of this patent is extended or adjusted under 35 U.S.C. 154(b) by 891 days.

(21) Appl. No.: 13/373,382

(22) Filed: Nov. 14, 2011

(65) Prior Publication Data

US 2012/0063271 A1 Mar. 15, 2012

Related U.S. Application Data

(63) Continuation of application No. 11/360,281, filed on Feb. 24, 2006, now abandoned.

(51) Int. Cl.
*G01V 1/16* (2006.01)
*G01V 1/18* (2006.01)
*G01V 1/06* (2006.01)

(52) U.S. Cl.
CPC *G01V 1/06* (2013.01); *G01V 1/162* (2013.01); *G01V 1/16* (2013.01); *G01V 1/181* (2013.01)

(58) Field of Classification Search
CPC ............ G01V 1/16; G01V 1/18; G01V 1/181
USPC .................................................. 367/178–179
See application file for complete search history.

(56) References Cited

U.S. PATENT DOCUMENTS

| | | | | |
|---|---|---|---|---|
| 3,336,530 A | * | 8/1967 | Sloan et al. | 340/539.11 |
| 3,721,956 A | * | 3/1973 | Hamann et al. | 340/429 |
| 4,365,240 A | * | 12/1982 | Scarpino et al. | 340/571 |
| 5,190,695 A | * | 3/1993 | Sotomura | 252/500 |
| 5,646,470 A | * | 7/1997 | de Groot | 310/337 |
| 6,034,614 A | * | 3/2000 | Haley | 340/690 |
| 6,768,066 B2 | * | 7/2004 | Wehrenberg | 200/61.49 |
| 2003/0044199 A1 | * | 3/2003 | Funabashi | 399/176 |
| 2007/0200137 A1 | * | 8/2007 | Smith | 257/108 |

* cited by examiner

*Primary Examiner* — Ian J Lobo
(74) *Attorney, Agent, or Firm* — Garrett James O'Sullivan; Timothy Marc Shropshire; Mu Patents

(57) ABSTRACT

A solid state seismic trigger switch has a tube, a first wire with a first end that extends into the tube, a soldered mass attached to the first end of the first wire, and a second wire in communication with the tube. The first wire and the soldered mass are suspended within the tube. The tube, the first wire, the second wire, and the soldered mass are conductive. The first wire and the second wire are electrically connected to a seismic recorder. Contact between the soldered mass and an interior wall of the tube closes an electrical circuit between the seismic recorder and the tube.

4 Claims, 3 Drawing Sheets

Side View Entire Module

Drawing References

A.) Outer module tube or hull. Can be of aluminum,titanium,brass..ect. Can be of variable length or outer diameter.
B.) Inner air filled copper tube.
C.) Two inline tinned copper wires, for contact closure. One wire is wrapped around or along the inner copper tube. The other wire runs down and through the center of the tube and holds the soldered mass. This soldered mass will cause a momentary contact closure when the outer hull senses an impact or vibration.
D.)Foam or silicon packing media.
E.) Soldered Mass.

Figure 1

*Side View Entire Module*

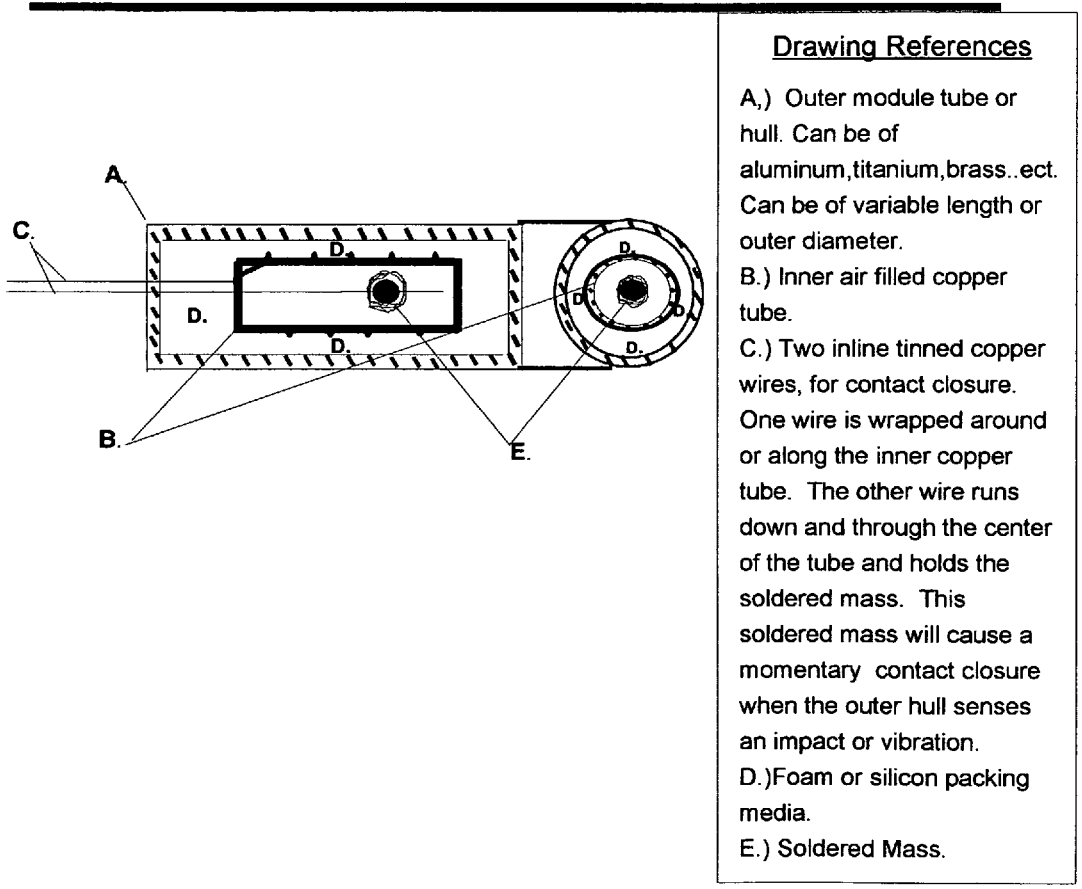

Drawing References

A.) Outer module tube or hull. Can be of aluminum,titanium,brass..ect. Can be of variable length or outer diameter.
B.) Inner air filled copper tube.
C.) Two inline tinned copper wires, for contact closure. One wire is wrapped around or along the inner copper tube. The other wire runs down and through the center of the tube and holds the soldered mass. This soldered mass will cause a momentary contact closure when the outer hull senses an impact or vibration.
D.)Foam or silicon packing media.
E.) Soldered Mass.

Figure 2

_Side View Inner Air Filled Copper Tube_

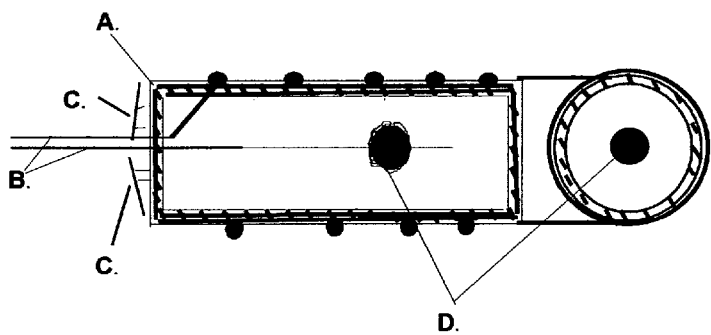

Drawing References

A.) Inner air filled copper or conductive tube.

B.) Two inline tinned copper wires, for contact closure. One wire is wrapped around or along the inner copper tube. The drawing attempts to show one wire wrapped around or coiled around the inner copper tube. The other wire runs down and through the center of the air filled tube and holds the soldered mass.

C.) Packing or silicone bonding agent, to secure wire through air filled copper tube and around or along the outside of the copper tube.

D.) Soldered mass. This soldered mass when it senses an impact or vibration will cause a momentary contact closure.

*Side View Inner Soldered Mass*

Drawing References
A.) Inner Soldered Mass.
B.) Wire on which the soldered mass is formed.

SOLID STATE SEISMIC TRIGGER SWITCH

FIELD OF THE INVENTION

This invention relates to precise triggering for time zero applications for all modern solid state seismic recording systems or other solid state DC voltage devices which require precise reliable, triggering, using specific G force or shock wave impact trigger coefficients. In one aspect, the invention relates to the reliability and durability of the triggering and the accuracy or repeatability of the trigger point in time. In another aspect, the invention also relates to the triggering of any device using a specified G force which can be of variable impact, as applied to the trigger module in any incidence or all incidences and directions, omni-directional. This design of the trigger is to sense motion imparted on or against the trigger assembly by shock waves and or G forces induced by a seismic impact hammer or explosive seismic source. This causes electrical contact between the solder mass and the inner part of the air filled copper tube which is in tight contact, or connected to the outer wire. This momentary contact closure then signals or switches the seismic recorder to record the resulting seismic wave forms. This design is totally unique and yet very simple.

BACKGROUND OF THE INVENTION

Historically, it has been very difficult and expensive to produce a seismic triggering apparatus which is designed to last long and prove to be very reliable in the field in conjunction with a wide variety of seismic sources. This is primarily because of the intensity of the repeated shock waves which these trigger apparatuses' have to be designed to sustain in the field, are so great on each impact, that they tend to fracture and break the internal components of the other current modern trigger switch modules relatively quickly in the field. The collection of seismic data productively, inexpensively and expeditiously in the field is a serious requirement for today's seismic oil and gas exploration industry as well as environmental or other seismic applications. Especially with state of the art modern accelerated mechanical impacting signal staking seismic sources. Many other modern current trigger switch models, all of which are solid state, break consistently from use in the field and have proven to be unreliable in the field for time zero switching, despite their great expense. Literally, thousands of repeatable and reliable impacts have been sustained by this new design, producing reliable and repeatable trigger switch closings greater than any competing design. This was impossible prior to October, 2001, when this prototype was first tested.

SUMMARY OF THE INVENTION

The simple design, evolved from years of experience in the field with such apparatuses and a new design of the trigger module's interior. This simple design includes two soldered tinned copper wires which are connected into the seismic recording device. One of these wires holds a soldered mass, at a specifically positioned point along the wire centered inside an air filled copper tube. The other wire is tightly coiled around the outside of the air filled copper tube or lain up otherwise tightly against it, with a packing media, in order to insure a good contact closure. This mass of solder, at a specific point along the tinned copper wire, is positioned through and along the center of the inner air filled copper tube near the end of the wire inside an air filled copper tube. This soldered mass is free to move around and is able to contact the inside of the air filled sealed copper tube momentarily, when it senses the impact shock wave from a given seismic source that it is attached to. This causes a momentary contact closure and triggers the seismic recorder to record the seismic data generated by the seismic source. To make the device, first, a soldered mass is made along a small segment of one of the two tinned copper wires near the end. The soldered mass in made by heating up some solder and melting it onto the wire into a circular shape near the end the wire. After the mass cools, this wire is then threaded inside and along the center of the air filled copper tube. A packing media or silicone glue is used to secure the entry end of the wire opposite where the soldered mass end is, holding it securely in the center of the air filled copper tube. The soldered mass end of this wire then rests just inside near the open end of the air filled copper tube within the center of the air filled copper tube. The second wire is then coiled up tightly against the outside of the air filled copper tube or otherwise lain up against it. Then a packing material or silicone is used to secure the outer wire to the outside of the air filled copper tube and also to secure this entire assembly inside an outer aluminum or titanium hull. The wire with the soldered mass that runs inside and along the center of the air filled copper tube, is free to move inside this air filled copper tube and make momentary contact inside of this air filled copper tube when the device senses contact. To use the device you simply connect the two wires which come from the outside of the outer hull into extension wires that hook directly into any given seismic recorders trigger connector. There are only two wires here. It is relatively easy to figure out which two wires are used on any given seismic recorder to connect this device, to trigger the seismic recorder to record. This is plainly and simply how to make and how to use this device which are the main requirements of this specification.

BRIEF DESCRIPTION OF THE DRAWINGS

FIG. 1 illustrates the side view entire module or side view cut away cross section view of my Seismic Trigger Switch Sold State.

FIG. 2 illustrates the side view of the inner soldered mass coil or copper tube, with a cut away cross section of my Seismic Trigger Switch Sold State as it can be situated.

DETAILED DESCRIPTION OF THE DRAWINGS

Figure 3:
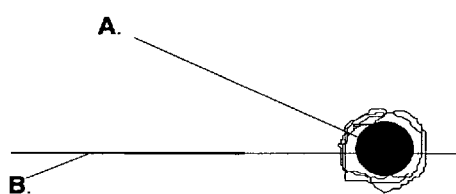
FIG. 3 illustrates the side view of the soldered mass. Note the mass can be variable and also it's placement or position along it's mounting wire.

FIG. 1: illustrates the side view entire module or side view. This is cut away so the position and relative size of the soldered mass. Note that the size of this mass and the mounting position of this mass on the wire will affect the sensitivity of the trigger. The wires coming into the soldered mass are the switch wires for the seismic recorder. There are only two and the amount of DC voltage does not matter. There is significant packing or padding around the inner copper air filled tube and the outer hull. This hull can be made from a variety of metals. I currently use Aluminum.

FIG. 2: illustrates the side view of the inner air filled copper tube. This view shows a cut away portion of the air filled copper tube so the position and relative size of the soldered mass can be seen. Note that the size of this soldered mass and the mounting position of it on the mounting wire will affect the sensitivity of the trigger. One of the input wires is wrapped around this clean air filled copper tube or lain tightly up against it. This figure shows this wire coiled or wrapped tightly around the clean air filled copper tube. The other wire is the wire which goes inside the air filled copper tube. I use copper for this, but it can be any conductive metal tube that will work with this design.

FIG. 3: illustrates the side view of just the wire that holds the soldered mass. This is cut away so the position and relative size of the soldered mass can be seen. Note that the size of this mass and the mounting position of the mass on the wire will affect the sensitivity of the trigger.

I claim:

1. A solid state trigger switch comprising:
   a. a tube;
   b. a first wire having a first end that extends into the tube;
   c. a soldered mass attached to the first end of the first wire, wherein the first wire and the soldered mass are suspended within the tube; and
   d. a second wire in communication with the tube,
   wherein the tube, the first wire, the second wire, and the soldered mass are conductive, wherein the first wire and the second wire are electrically connected to a seismic recorder, wherein contact between the soldered mass and an interior wall of the tube is configured to close an electrical circuit between the seismic recorder and the tube.

2. The solid state trigger switch of claim 1, further comprising:
   a. an outer hull; and
   b. packing material,
   wherein the tube is secured within the outer hull by the packing material.

3. The solid state trigger switch of claim 2, wherein the packing material is silicone.

4. The solid state trigger switch of claim 1, wherein the second wire is in electrical communication with an exterior surface of the tube.

* * * * *